United States Patent
Yoneyama

[11] 3,821,794
[45] June 28, 1974

[54] PHOTOGRAPHIC COLOR FILM TELEVISING APPARATUS

[75] Inventor: Masahide Yoneyama, Kawasaki, Japan

[73] Assignee: Nippon Columbia Kabushikikaisha (Nippon Columbia Co., Ltd.), Tokyo, Japan

[22] Filed: Dec. 8, 1971

[21] Appl. No.: 205,807

[30] Foreign Application Priority Data
Dec. 12, 1970 Japan .............................. 45-110906

[52] U.S. Cl............. 358/47, 350/162 SF, 350/317, 358/5
[51] Int. Cl........................ H04n 9/06, G02b 27/38
[58] Field of Search..... 178/5.4 ST, DIG. 25, 5.2 D; 350/162 SF, 317, 196

[56] References Cited
UNITED STATES PATENTS
| | | | |
|---|---|---|---|
| 2,733,291 | 1/1956 | Kell | 178/5.4 ST |
| 3,549,237 | 12/1970 | Bouche et al. | 350/162 SF |
| 3,572,900 | 3/1971 | Bouche | 350/162 SF |
| 3,681,519 | 8/1972 | Larsen et al. | 350/162 SF |

FOREIGN PATENTS OR APPLICATIONS
| | | | |
|---|---|---|---|
| 158,287 | 8/1954 | Australia | 350/317 |
| 1,001,537 | 8/1965 | Great Britain | 350/196 |

Primary Examiner—Ronald J. Stern
Attorney, Agent, or Firm—George B. Oujevolk

[57] ABSTRACT

A single-tube photographic color film televising apparatus having an optical system. In this case the optical system consists of a device for Fourier transformation of an image to be televised and a spatial filter for band-width limitation of three color components of said image to prevent occurrence of spurious signals due to crosstalk between said three color components.

2 Claims, 14 Drawing Figures

INVENTOR
MASAHIDE YONEYAMA

BY GEORGE B. OUJEVOLK

ATTORNEY

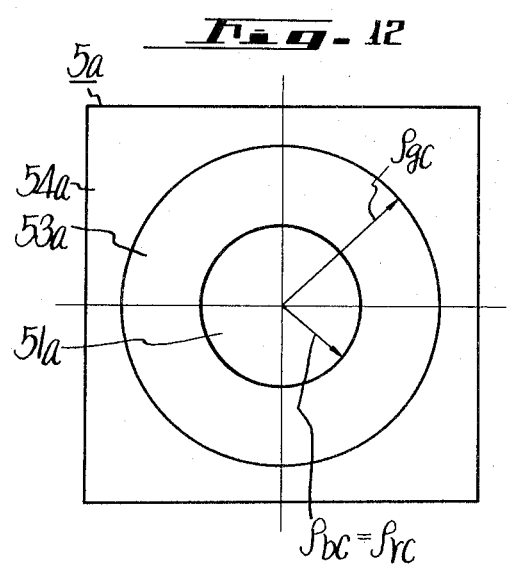

PHOTOGRAPHIC COLOR FILM TELEVISING APPARATUS

BACKGROUND OF THE INVENTION

1. Field of the Invention

This invention relates to a single-tube photographic color film televising apparatus.

2. Description of the Prior Art

In a conventional single-tube color camera of the frequency separation type, an optical filter is disposed in the optical system to separate incident light from the object being televised into a luminance signal Y and red and blue color signals R and B. The optical filter is an assembly of two kinds of filter components, one filter component consisting of two kinds of strip filter elements, one inhibiting the passage therethrough of red color light and the other permitting the passage therethrough of white color light and the other filter component consisting of two kinds of strip filter elements, one inhibiting the passage therethrough of blue color light and the other permitting the passage therethrough of white color light, the pitches of the former and latter strip filter elements being different from each other. Due to a limit in the spatial frequency response characteristic of the optical filter from the object to the color filter including an objective lens, the spatial frequency spectrum of the image of the object projected on the optical filter is limited and its upper limit is thereby inevitably defined. Accordingly, there is also an upper limit in the spectrum of the frequency $\omega$ in the case of scanning the image of the object projected on the optical filter. For ideal multiple signal transmission, the frequency spectrum of the multiple signal must be selected such as shown in FIG. 1 in which a cut-off frequency of the luminance signal Y is $\omega_m$ and the center frequencies of the red and blue color signals are $2\omega_m$ and $4\omega_m$ respectively, the abscissa representing the frequency and the ordinate the spectrum intensity.

However, such an ideal multiple signal transmission as shown in FIG. 1 is impossible because of a limit in the frequency characteristic of the camera tube including the optical path from the optical modulation surface formed by the aforementioned optical filter to the camera tube. Accordingly, the green, red and blue color signals Y, R and B are located within the transmission band of the image pickup tube, permitting crosstalk between the respective channels. FIG. 2 shows the spectrums of these signals, in which reference characters $\omega_R$ and $\omega_B$ on the abscissa indicate the center frequencies of the red and blue color signals respectively. The separation of the luminance signal Y and the red and blue color signals R and B is achieved by the employment of a filter made up of one low-pass filter and two bandpass filters which have such pass band characteristics as indicated by LPF, BPF-R and BPF-B in FIG. 3 respectively. In this case, the spectrum components of the adjacent channels are mixed as crosstalk in each filter, so that a spurious signal is produced by the crosstalk component after demodulation.

The generation of such a spurious signal will be particularly noted in the case of an image of an object to be televised which includes an abrupt change from black to white.

The waveform of the output derived from the color signal separating bandpass filter after such modulation as hereinbefore described is as shown in FIG. 4 in which the abscissa represents time and the ordinate amplitude. FIG. 4A shows the signal waveform at its rising portion $\tau$ in the absence of crosstalk and FIG. 4B the waveform of the crosstalk component contained in the rising portion $\tau$ of the signal waveform. Accordingly, the overall output waveform in the case of crosstalk is the sum of the waveforms of FIGS. 4A and 4B. In this case, the phase of the crosstalk in FIG. 4B is determined by the time of the color change in the image of the object, while the phase of the signal waveform of FIG. 4A is determined by that of arrangement of the strip filter elements of the optical filter. Accordingly, the phases of the waveforms shown in FIGS. 4A and 4B vary from 0 to $\pi$ with the relative phase of the marginal portion of the image of the object to the optical filter. That is, when the both waveforms are in-phase they are added to each other and in the opposite case they are subtracted from each other. Consequently, the signal produced by detecting the output of the color signal separating filter varies in the rising point as indicated by $a$ and $b$ in FIG. 5, in which the ordinate represents amplitude and the abscissa time.

Accordingly, when the phase change of the image portion caused by a color change is large with relation to the arrangement of the strip filter elements of the optical filter and varies at every scanning, the rising point of a signal after domodulation changes greatly to produce a spurious signal. In this case, a picture as shown in FIGS. 6A and 6B is reproduced and displayed on the screen of a television receiver.

FIG. 6A illustrates the original image of the object with an abrupt change in color from black to white. FIG. 6B shows a picture which is reproduced after being transmitted in accordance with the frequency separation system and which includes a zigzag portion F caused by the spurious signal produced for the reason hereinbefore given.

SUMMARY OF THE INVENTION

One object of this invention is to provide a photographic color film television apparatus which is free from crosstalk between adjacent channels, and hence a spurious signal resulting therefrom.

Another object of this invention is to provide a photographic color film televising apparatus in which high-frequency components of the spatial frequency spectrums of red, green and blue primary color signal components of an object to be televised are removed before optical frequency multiplication with a striped filter. In this case, the spatial frequency spectrums of the red and blue color signal components may be narrowed a little as compared with the green color signal component because of the fact that so long as resolution and SN ratio of the luminance signal are excellent, the quality of the reproduced picture is not greatly deteriorated even though the chrominance signal deteriorates to some extent.

Other objects, features and advantages of this invention will become apparent from the following description when taken in conjunction with the accompanying drawings, in which:

BRIEF DESCRIPTION OF THE DRAWING

FIG. 12 is a diagram illustrating a modified form of the spatial filter of this invention.

DESCRIPTION OF THE PREFERRED EMBODIMENTS

In accordance with this invention, the frequency bands of red, green and blue primary color components are optically limited by Fourier transformation and the spatial filter techniques to prevent occurrence of crosstalk and spurious signals resulting therefrom, so as to have an enhanced quality of a reproduced picture.

The Fourier transformation of the amplitude distribution of an object is obtained in the following manner. When the object is placed in a beam of parallel rays emitted from a first lens having a single-color point source of light in its forward focal plane, a Fraunhofer's diffraction image of the object is obtained in the rearward focal plane (hereinafter referred to as a Fourier transformation plane) of a second lens which coincides the object with its forward focal plane. In this case, the amplitude distribution of the object is proportional to the Fourier transformation. This is referred to as a spatial frequency spectrum of the amplitude distribution of the object. Further, co-ordinates on the Fourier transformation plane are proportional to the spatial frequency. Referring now to FIGS. 7 to 11, a detailed description will be given of one example of this invention utilizing the above principle.

Figure 1:
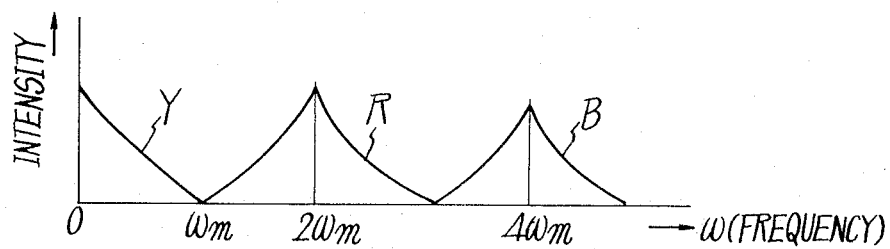
FIG. 1 is a graph showing an ideal distribution of a multiple signal of a frequency separating type camera, for used to explain this invention.
Figure 2:
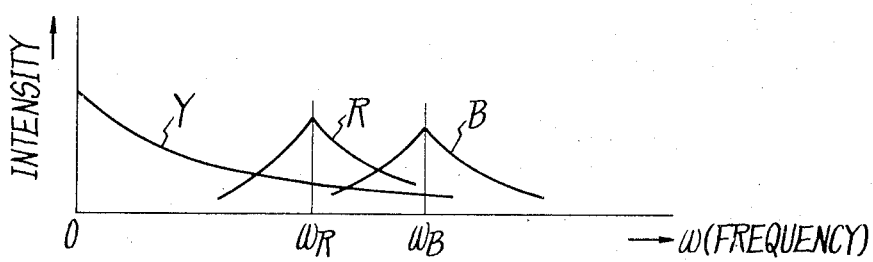
FIG. 2 is a graph illustrating an actual distribution of the spectrum of the multiple signal in which crosstalk is caused between adjacent channels.
Figure 3:
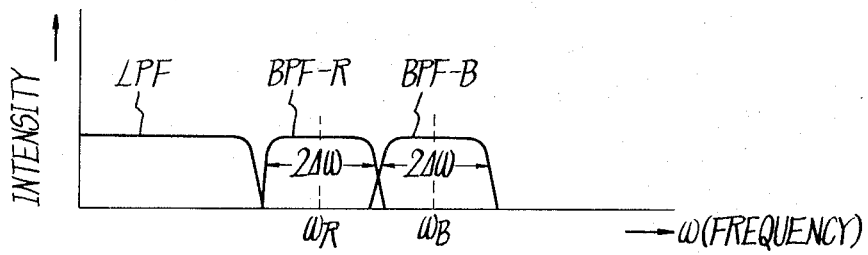
FIG. 3 is a graph showing the pass band characteristics of multiple signal separating filter.
Figure 4A:
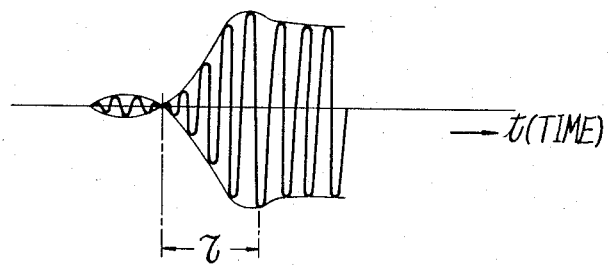
FIG. 4A is a waveform diagram showing a color signal derived from the color signal separating filter.
Figure 4B:
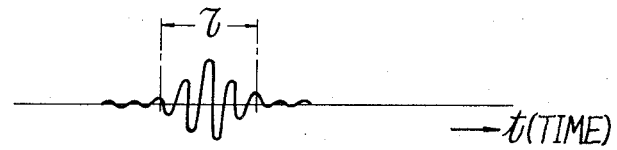
FIG. 4B is a waveform diagram showing a crosstalk component derived from the color signal separating filter.
Figure 5:
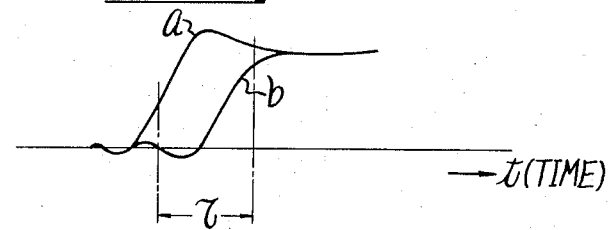
FIG. 5 is a waveform diagram of the color signal after being detected, showing a change of its rise in terms of time.
Figure 6A:
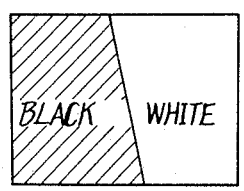
FIG. 6A is a diagram showing one of the picture of an object which produces a spurious signal.
Figure 6B:
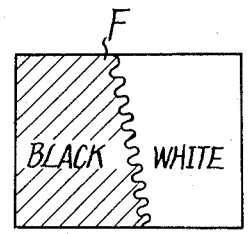
FIG. 6B is the reproduced picture.
Figure 7:
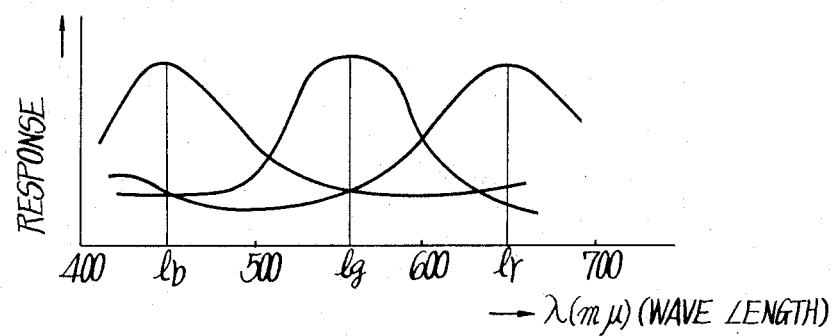
FIG. 7 is a graph showing the spectral distribution of a typical color film and the wavelength of a point source of light for reproducing the color film.

A light source for reproducing a color film having a typical spectral distribution as shown in FIG. 7 is required to emit three single-colored lights of different wavelengths λ as indicated by $l_b$, $l_g$ and $l_r$ in the figure. In the case of employing, for example, gas laser as the light source, $l_r$ is 632.8mμ which is the wavelength of He-Ne gas laser and $l_b$ and $l_g$ are 488.0mμ and 514.5mμ which are wavelength of pair output of Ar gas laser.

Figure 8:
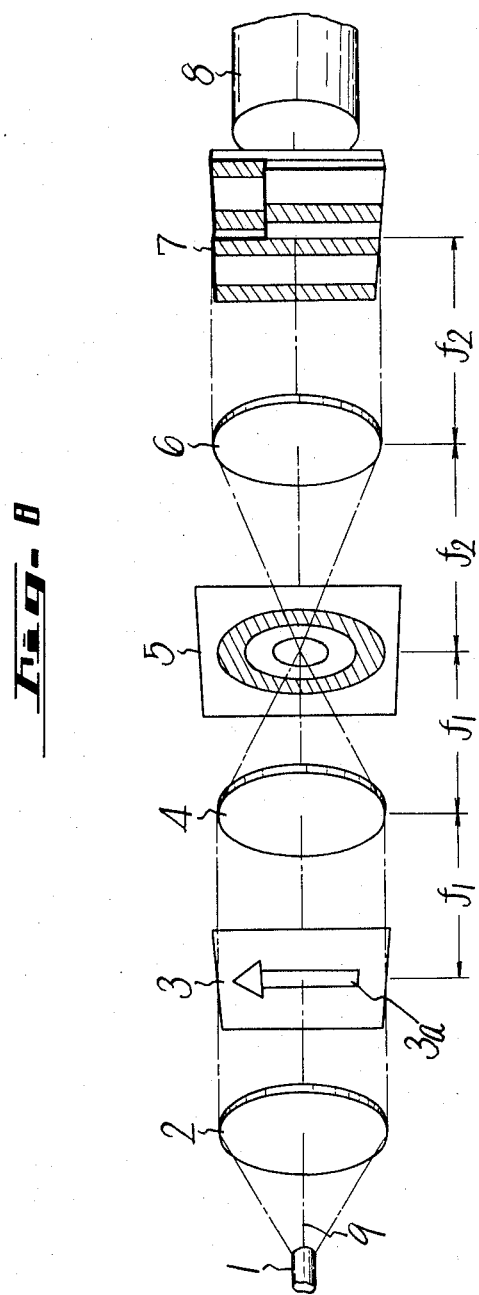
FIG. 8 is a schematic diagram showing one example of an optical system of this invention.

As depicted in FIG. 8, a color film 3 having recorded thereon an image 3a of an object to be televised is disposed in a beam of parallel rays of light emitted from a collimeter lens (a first lens) 2 in the forward focal plane of which is placed a point source of light 1 emitting three single-colored lights of the above wavelengths. A spatial frequency spectrum of the amplitude distribution of the color film 3 to the three single-colored lights appears in the rearward focal plane (Fourier transformation plane) of a second lens 4 (of a focal length $f_1$) which is disposed with its forward focal plane in agreement with the plane of the color film 3. In the Fourier transformation plane a spatial filter 5 is disposed. The spectrum image on the Fourier transformation plane is again subjected to Fraunhofer's diffraction onto the rearward focal plane (referred to as a reproducing plane) of a third lens 6 of a focal length $f_2$ which is disposed with its forward focal plane in agreement with the Fourier transformation plane. In this case, an optical image of the color film 3 affected by the spatial filter 5 is obtained on the reproducing plane. The optical image of the color film 3 appearing on the reproducing plane is frequency-multiplied by a striped filter 7 and then converted by an image pickup tube 8 into a corresponding electric signal.

Needless to say, the respective optical elements employed in the optical system are all disposed on the same ray axis 9.

A discussion will be made in connection with the condition that the spatial filter 5 removes the high-frequency components of the spatial frequency spectrums of the red, green and blue primary color components of the image of the object. As above described, the co-ordinates on the Fourier transformation plane are proportional to the spatial frequency, so that if the spatial frequency spectrums of the color film 3 are all equal in any direction, the spatial frequency spectrum images are distributed concentrically about the ray axis 9 and the relationship between the radius ρ of the outer diffraction image and the effective spatial frequency S is given the following equation (1).

$$\rho = fls \qquad (1)$$

where $f$ is the focal length of the lens and $l$ the wavelength of light. Accordingly, when the color film 3 is irradiated by the three single-colored lights of the different wavelengths $l_b$, $l_g$ and $l_r$ from the point source of light 1, the spectrum images on the Fourier transformation plane are different in magnitude according to the respective wavelengths and their radiuses $\rho_b$, $\rho_g$ and $\rho_r$ are given by the following equation (2).

$$\rho_b = fl_b S_b$$
$$\rho_g = fl_g S_g$$

$$\rho_r = fl_r S_r \qquad (2)$$

where $S_b$, $S_g$ and $S_r$ are effective spatial frequencies corresponding to the red, green and blue single-colored lights. If the interrelationships between respective amplitude transmission factor distribution functions of the color film 3 corresponding to the three single-colored lights are strong, the respective effective spatial frequencies become equal to each other as follows:

$$\rho_g = (lg/lb)\rho_b,$$
$$\rho_r = (lr/lb)\rho_b$$

Figure 9:
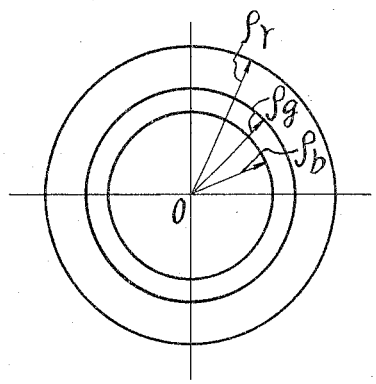
FIG. 9 is a diagram showing one example of distribution of diffraction images when objects of equal spatial spectrum are irradiated by single-color lights of different wavelengths.

The distribution in this case is shown for FIG. 9.

The bandwidths of the channels for the red, green and blue colors are limited in spectrum by the spatial filter 5 disposed in the Fourier transformation plane but are determined by the bandwidths required when the optical image was converted by the scanning of the standard television system into an electric signal. For example, where the frequency bandwidths $f_g$, $f_r$ and $f_b$ of the electric signals corresponding to the red, green and blue color signals after photoelectric conversion are selected to be of the following values in consideration of such property of the television signal as previously described, $$f_g = 3\text{MHz}, f_r = f_b = 0.5\text{MHz}$$

the spatial frequencies of the image of the object to be televised which are to be limited are also proportional to the above bandwidth. Accordingly, the upper limits $\rho_{bc}$, $\rho_{gc}$ and $\rho_{rc}$ of the spatial frequencies in the Fourier transformation plane are given as follows:

$$\rho_{bc} = 0.5kfl_b$$
$$\rho_{gc} = 3kfl_g$$
$$\rho_{rc} = 0.5kfl_r$$

(4)

where $k$ is a coefficient of time-space conversion.

Figure 10:
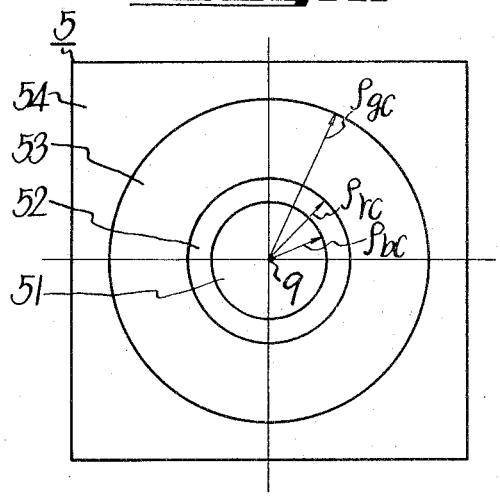
FIG. 10 is a diagram illustrating one example of the construction of a spatial filter of this invention.
Figure 11:
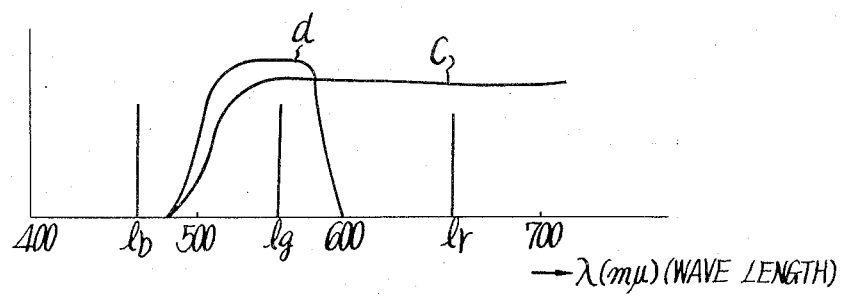
FIG. 11 is a graph showing the wavelength characteristics of the spatial filter depicted in FIG. 10.

FIG. 10 shows one example of the construction of the spatial filter 5 which satisfies such conditions. The spatial filter 5 has circular regions 51, 52 and 53, formed about the origin, that is, the ray axis 9 whose radiuses are the upper limits $\rho_{bc}$, $\rho_{gc}$ and $\rho_{rc}$ of the spatial frequencies in the Fourier transformation plane which are defined by the equation 4. The circular region 51, whose radius $\rho_{bc}$ is smaller than the other, is formed of a colorless, transparent material permitting the passage therethrough of all the red, green and blue color lights, the circular region 52 of the radius $\rho_{rc}$, disposed between the regions 51 and 53, is formed of a yellow, transparent material permitting the passage therethrough of the green and red color lights but inhibiting the passage therethrough of the blue color light and the circular region 53 of the radius $\rho_{gc}$, disposed outside of the region 52, is formed of a green, transparent material permitting the passage therethrough of only the green light and inhibiting the passage therethrough of the blue and red color lights. A region 54 outside of the region 53 is formed of an opaque material inhibiting the passage therethrough of all of the three color lights. FIG. 11 shows the relationship between the wavelength $\mu$ of the light from the light source 1 and that of the light having passed through the spatial filter 5. In the figure curves $c$ and $d$ designate lights having passed through the regions 52 and 53 respectively.

Referring now to FIG. 12, another example of the spatial filter for use in this invention will be described.

It will be readily understood that if the relation between the frequency bands of the red and blue color component signals after the aforementioned photoelectric conversion is selected such that $f_r/f_g = l_g/l_r$, the spatial frequency spectrum images of the corresponding red and blue colors are of the same size. Accordingly, the construction of the spatial filter is simplified. Namely, a region 51a from the origin to the radius $\rho_{bc} = \rho_{rc}$ is formed of a colorless, transparent material, a region 53a covering the area outside of the radius $\rho_{bc} = \rho_{rc}$ and inside of the radius $\rho_{gc}$ is formed of a green, transparent material and a region 54a outside of the radius $\rho_{gc}$ is formed of an opaque material.

With the spatial filter of this invention described above, the red, green and blue colors can be limited in spectrum with sharp cutoff characteristics independently or in association with one another. Accordingly, it is possible to prevent crosstalk between the channels of the respective color signals, and hence eliminate generation of a spurious signal which is caused by the crosstalk.

It will be apparent that many modifications and variations may be effected without departing from the scope of the novel concepts of this invention.

I claim as my invention:

1. A photographic color film televising apparatus comprising:

light source means for producing radiation which has a plurality of wavelengths;

first lens means for forming an optical Fourier transform of an optical image recorded on photographic color film, said film being disposed between said light source means and said first lens means;

a spatial filter disposed at the location of the optical Fourier transform formed by said first lens means;

second lens means for forming a reverse optical Fourier transform of the transform formed by said first lens means and modified by the spatial filter, thereby forming an image to be televised; and means including a single tube color camera for picking up said image to be televised, wherein said first and second lens means have different focal lengths for each wavelength provided by said light source means; and wherein said spatial filter has a first central circular area, a second annular area surrounding said first area, and a third area beginning at the outer radius of the second area, all said areas being concentric with each other, said first area having the smallest radius and formed of a colorless transparent material permitting the passage therethrough of all red, green and blue color light, the second annular region of the next larger radius being formed of a green transparent material permitting the passage therethrough of only the green color light and inhibiting the passage therethrough of the blue and red color light, and said third area outside of the second annulus formed of an opaque material inhibiting the passage therethrough of all light, the radial extent of each area being chosen so as to substantially prevent cross-talk among chrominance and luminance signals produced by said single tube color camera.

2. A photographic color film televising apparatus comprising:

light source means for producing radiation which has a plurality of wavelengths;

first lens means for forming an optical Fourier transform of an optical image recorded on photographic color film, said film being disposed between said light source means and said first lens means;

a spatial filter disposed at the location of the optical Fourier transform formed by said first lens means;

second lens means for forming a reverse optical Fourier transform of the transform formed by said first lens means and modified by the spatial filter, thereby forming an image to be televised; and means including a single tube color camera for picking up said image to be televised, wherein said first and second lens means have different focal lengths for each wavelength provided by said light source means; and wherein said spatial filter has a first central circular area, second and third annular areas surrounding said first area and a fourth area beginning at the outer radius of said third area, all said areas being concentric with each other, said first area having the smallest radius and formed of a colorless transparent material permitting the passage therethrough of red, green and blue color light, said second area of the next larger radius being formed of a yellow, transparent material permitting the passage therethrough of green and red color light but inhibiting the passage therethrough of the blue color light, and the third area of the next largest radius disposed outside of said second area being formed of a green, transparent material permitting the pasage therethrough of only the green color light and inhibiting the passage therethrough of the blue and red color light, said fourth area outside of said third area being formed of an opaque material inhibiting the passage therethrough of all light, the radial extent of each area being chosen so as to substantially eliminate crosstalk among chrominance and luminance signals produced by said single tube color camera.

* * * * *